United States Patent
Lim et al.

(10) Patent No.: US 12,292,670 B2
(45) Date of Patent: *May 6, 2025

(54) REMOVABLE CAMERA LENS COVER

(71) Applicant: GoPro, Inc., San Mateo, CA (US)

(72) Inventors: Way Chet Lim, Menlo Park, CA (US); Andrew Liu, San Carlos, CA (US); Margaret Birmingham Mittan, Piedmont, CA (US); Daniel Lee Sobel, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,597

(22) Filed: Nov. 7, 2023

(65) Prior Publication Data
US 2024/0069411 A1    Feb. 29, 2024

Related U.S. Application Data

(63) Continuation of application No. 18/083,772, filed on Dec. 19, 2022, now Pat. No. 11,846,870, which is a
(Continued)

(51) Int. Cl.
*G03B 11/06*     (2021.01)
*G03B 11/04*     (2021.01)
(Continued)

(52) U.S. Cl.
CPC .......... *G03B 11/06* (2013.01); *G03B 11/041* (2013.01); *G03B 17/08* (2013.01); *G03B 17/12* (2013.01); *G03B 17/55* (2013.01)

(58) Field of Classification Search
None
See application file for complete search history.

(56) References Cited

U.S. PATENT DOCUMENTS

| | | |
|---|---|---|
| 2,186,610 A | 1/1940 | Leavitt |
| 3,133,140 A | 5/1964 | Winchell |
| (Continued) | | |

FOREIGN PATENT DOCUMENTS

| | | |
|---|---|---|
| CN | 302760937 S | 3/2014 |
| CN | 302767938 S | 3/2014 |
| (Continued) | | |

OTHER PUBLICATIONS

Geometric Image Transformations, https://docs.opencv.org/2.4/modules/imgproc/doc/geometric_transformations.html?highlight=resize#cv2.resize, OpenCV2.4.13.7, retrieved on Aug. 4, 2020, 11 pages.
(Continued)

*Primary Examiner* — Rodney E Fuller
(74) *Attorney, Agent, or Firm* — Young Basile Hanlon & MacFarlane, P.C.

(57) ABSTRACT

A camera is configured for use with a removable camera lens cover, which can be secured to or removed from the camera by a user without the use of a tool set. The mechanism which allows the lens cover to be secured to and removed from the camera includes a set of wires embedded into the lens cover and a set of wedges protruding from the lens wall of the camera. To secure the lens cover to the camera, the lens cover is placed onto the front of the camera and rotated until the wires align with corresponding wedges, securing the wires underneath the tapered surface of the wedges. To remove the lens cover from the camera, a force is applied outward and normal to the lens cover, causing the wires to flex outward and enabling the rotation and removal of the lens cover from the camera.

20 Claims, 7 Drawing Sheets

Related U.S. Application Data continuation of application No. 17/093,246, filed on Nov. 9, 2020, now Pat. No. 11,543,733, which is a continuation of application No. 16/541,760, filed on Aug. 15, 2019, now Pat. No. 10,845,675, which is a continuation of application No. 16/005,043, filed on Jun. 11, 2018, now Pat. No. 10,401,705, which is a continuation of application No. 14/970,323, filed on Dec. 15, 2015, now Pat. No. 9,995,990.

(51) Int. Cl.
*G03B 17/08* (2021.01)
*G03B 17/12* (2021.01)
*G03B 17/55* (2021.01)

(56) References Cited

U.S. PATENT DOCUMENTS

| | | | |
|---|---|---|---|
| 4,239,364 A | 12/1980 | Doi | |
| 4,451,130 A | 5/1984 | Yan | |
| 4,659,203 A | 4/1987 | Niwa | |
| 4,957,328 A | 9/1990 | Tsutsui | |
| 5,077,567 A | 12/1991 | Haraguchi | |
| 5,262,899 A | 11/1993 | Iizuka | |
| 5,642,235 A | 6/1997 | Ichikawa | |
| 5,828,406 A | 10/1998 | Parulski | |
| 5,847,888 A | 12/1998 | Takahashi | |
| 6,079,883 A | 6/2000 | Mori | |
| 6,608,648 B1 | 8/2003 | Bean | |
| 7,161,749 B2 | 1/2007 | Sakurai | |
| 7,717,630 B1 | 5/2010 | Wan | |
| 8,174,613 B2 | 5/2012 | Nakamura | |
| 8,294,988 B2 | 10/2012 | Cook | |
| D727,387 S | 4/2015 | Hasegawa | |
| D730,423 S | 5/2015 | Vandenbussche | |
| D742,953 S | 11/2015 | Li | |
| D745,589 S | 12/2015 | Lee | |
| D750,687 S | 3/2016 | Samuels | |
| D760,312 S | 6/2016 | Lee | |
| D765,755 S | 9/2016 | Pellegrino | |
| D773,547 S | 12/2016 | Lee | |
| D785,068 S | 4/2017 | Patsis | |
| D787,687 S | 5/2017 | Vezina | |
| D788,835 S | 6/2017 | Wu | |
| 9,743,001 B1 | 8/2017 | Stec | |
| D816,751 S | 5/2018 | Harrison | |
| 9,995,990 B2 | 6/2018 | Lim | |
| 10,205,865 B2 | 2/2019 | Han | |
| D848,500 S | 5/2019 | Miyashita | |
| D848,512 S | 5/2019 | Kamei | |
| D852,868 S | 7/2019 | Huang | |
| D858,603 S | 9/2019 | Ye | |
| 10,401,705 B2 | 9/2019 | Lim | |
| 10,678,118 B2 | 6/2020 | Warren | |
| 10,701,249 B1 | 6/2020 | Guo | |
| D893,576 S | 8/2020 | Kyte | |
| 10,845,675 B2 | 11/2020 | Lim | |
| D906,396 S | 12/2020 | Schaarschmidt | |
| D917,598 S | 4/2021 | Ye | |
| D949,227 S | 4/2022 | Tang | |
| D957,497 S | 7/2022 | Laffon De Mazieres | |
| 11,425,286 B2 | 8/2022 | Vitale | |
| D963,729 S | 9/2022 | Uetsuji | |
| D965,660 S | 10/2022 | Ibragimov | |
| D967,227 S | 10/2022 | Sun | |
| D967,233 S | 10/2022 | O'Connor | |
| D967,890 S | 10/2022 | Nguyen | |
| D974,449 S | 1/2023 | Nguyen | |
| D974,450 S | 1/2023 | Muhlenkamp, IV | |
| D976,983 S | 1/2023 | Znamensky | |
| 11,630,376 B2 | 4/2023 | Thomas | |
| D985,038 S | 5/2023 | Lee | |
| D990,544 S | 6/2023 | O'Connor | |
| D991,317 S | 7/2023 | Nguyen | |
| 11,696,008 B2 | 7/2023 | Vitale | |
| 11,796,895 B2 | 10/2023 | Thomas | |
| D1,004,675 S | 11/2023 | Nguyen | |
| 11,809,072 B2 | 11/2023 | Alm | |
| D1,006,860 S | 12/2023 | Yan | |
| 11,846,870 B2 * | 12/2023 | Lim | G03B 17/55 |
| D1,016,877 S | 3/2024 | Laffon De Mazieres | |
| D1,018,633 S | 3/2024 | Muhlenkamp, IV | |
| 11,986,162 B2 | 5/2024 | Moreau | |
| 2004/0240870 A1 | 12/2004 | Stiehler | |
| 2006/0007551 A1* | 1/2006 | Sakurai | G03B 11/045 359/611 |
| 2008/0094708 A1 | 4/2008 | Huang | |
| 2009/0002823 A1 | 1/2009 | Law | |
| 2009/0091827 A1 | 4/2009 | Gauger | |
| 2010/0073771 A1* | 3/2010 | Kitakata | G03B 17/02 359/611 |
| 2010/0149408 A1 | 6/2010 | Ito | |
| 2010/0302638 A1 | 12/2010 | Cuadra | |
| 2013/0028590 A1 | 1/2013 | Hasuda | |
| 2013/0071101 A1 | 3/2013 | Idera | |
| 2013/0129338 A1 | 5/2013 | Dowell | |
| 2013/0272010 A1 | 10/2013 | Kawamura | |
| 2013/0329310 A1 | 12/2013 | Toyama | |
| 2014/0043733 A1* | 2/2014 | Huang | H05B 47/115 361/679.01 |
| 2015/0093104 A1 | 4/2015 | Clyne | |
| 2015/0164422 A1 | 6/2015 | Lee | |
| 2016/0066459 A1 | 3/2016 | Rayner | |
| 2016/0181722 A1 | 6/2016 | Tsai | |
| 2016/0205294 A1 | 7/2016 | Ahn | |
| 2017/0102512 A1 | 4/2017 | Yamaoda | |
| 2017/0102513 A1 | 4/2017 | Ogata | |
| 2017/0168374 A1 | 6/2017 | Lim | |
| 2017/0223239 A1 | 8/2017 | Petty | |
| 2018/0017785 A1 | 1/2018 | Bulgajewski | |
| 2018/0088443 A1 | 3/2018 | Riddiford | |
| 2018/0091775 A1 | 3/2018 | Jung | |
| 2018/0107099 A1 | 4/2018 | Yasuda | |
| 2018/0143512 A1 | 5/2018 | Campbell | |
| 2018/0292731 A1 | 10/2018 | Lim | |
| 2019/0056638 A1 | 2/2019 | Decker | |
| 2019/0158709 A1 | 5/2019 | Petty | |
| 2019/0208099 A1 | 7/2019 | Cotoros | |
| 2019/0219897 A1 | 7/2019 | Tiongson | |
| 2019/0320101 A1 | 10/2019 | Lincoln | |
| 2019/0342473 A1 | 11/2019 | Clearman | |
| 2020/0026023 A1 | 1/2020 | Nagaoka | |
| 2020/0033698 A1 | 1/2020 | Lim | |
| 2021/0141287 A1 | 5/2021 | Lim | |
| 2021/0274067 A1 | 9/2021 | Crow | |
| 2021/0306536 A1 | 9/2021 | Nicholas | |
| 2021/0397070 A1 | 12/2021 | Thomas | |
| 2022/0353400 A1 | 11/2022 | Nicholas | |
| 2023/0119639 A1 | 4/2023 | Lim | |
| 2023/0205057 A1 | 6/2023 | Thomas | |
| 2023/0291983 A1 | 9/2023 | Nicholas | |
| 2024/0004272 A1 | 1/2024 | Thomas | |

FOREIGN PATENT DOCUMENTS

| | | |
|---|---|---|
| CN | 303348699 S | 8/2015 |
| CN | 304806727 S | 9/2018 |
| CN | 305115460 S | 4/2019 |
| CN | 305381963 S | 10/2019 |
| CN | 305465957 S | 11/2019 |
| CN | 305473224 S | 12/2019 |
| CN | 305726026 S | 4/2020 |
| CN | 305973914 S | 8/2020 |
| EP | 1619882 A2 | 1/2006 |
| WO | D2018860020 | 7/2019 |
| WO | 2020055511 A1 | 3/2020 |

OTHER PUBLICATIONS

International Preliminary Report on Patentability issued in App. No. PCT/US2021/024462, mailing date Oct. 13, 2022, 9 pages.

(56) References Cited

OTHER PUBLICATIONS

International Preliminary Report on Patentability issued in App. No. PCT/US2021/037757, mailing date Dec. 29, 2022, 6 pages.
International Search Report and Written Opinion for App. No. PCT/US2020/042749, mailing date Apr. 15, 2021, 10 pages.
International Search Report and Written Opinion for App. No. PCT/US2021/024462, dated Jul. 8, 2021, 10 pages.
International Search Report and Written Opinion for App. No. PCT/US2021/037757, date of mailing Oct. 7, 2021, 6 pages.
Miscellaneous Image Transformations, https://docs.opencv.org/2.4/modules/imgproc/doc/miscellaneous_transformations.html#cvtcolor, OpenCV2.4.13.7, retrieved on Aug. 4, 2020, 12 pages.
scipy.optimize.minimize, https://docs.scipy.org/doc/scipy/reference/generated/scipy.optimize.minimize.html, retrieved on Aug. 4, 2020, 6 pages.
Structural Analysis and Shape Descriptors, https://docs.opencv.org/2.4/modules/imgproc/doc/structural_analysis_and_shape_descriptors.html?highlight=minenclosingcircle#minenclosingcircle, retrieved on Aug. 4, 2020, 27 pages.
Structural Analysis and Shape Descriptors, https://docs.opencv.org/3.4/d3/dc0/group_imgproc_shape.html#ga17ed9f5d79ae97bd4c7cf18403e1689a, OpenCV, retrieved on Aug. 4, 2020, 12 pages.
U.S. Appl. No. 16/803,139, filed Feb. 27, 2020, Crow et al.
Wikipedia, Histogram, https://en.wikipedia.org/wiki/Histogram#Cumulative_histogram, retrieved on Aug. 4, 2020, 7 pages.
Wikipedia, Magic number (programming), https://en.wikipedia.org/wiki/Magic_number_%28programming%29, retrieved on Aug. 4, 2020, 8 pages.
Wikipedia, Median absolute deviation, https://en.wikipedia.org/wiki/Median_absolute_deviation, retrieved on Aug. 4, 2020, 3 pages.
Wikipedia, Random sample consensus, https://en.wikipedia.org/wiki/Random_sample_consensus, retrieved on Aug. 4, 2020, 5 pages.
Wikipedia, YUV, https://en.wikipedia.org/wiki/YUV, retrieved on Aug. 4, 2020, 9 pages.
"Digital SLR Photography Tutorial," first edition, Jan. 2010, 10 pages.

\* cited by examiner

REMOVABLE CAMERA LENS COVER

CROSS REFERENCE TO RELATED APPLICATIONS

This application is a continuation of U.S. application Ser. No. 18/083,772, filed Dec. 19, 2022, which is a continuation of U.S. application Ser. No. 17/093,246, filed on Nov. 9, 2020, now U.S. Pat. No. 11,543,733, which is a continuation of U.S. application Ser. No. 16/541,760, filed on Aug. 15, 2019, now U.S. Pat. No. 10,845,675, which is a continuation of U.S. application Ser. No. 16/005,043, filed on Jun. 11, 2018, now U.S. Pat. No. 10,401,705, which is a continuation of U.S. application Ser. No. 14/970,323, filed on Dec. 15, 2015, now U.S. Pat. No. 9,995,990, the entire content of each of the above-identified applications being incorporated by reference herein.

TECHNICAL FIELD

This disclosure relates to cameras, and more specifically, to a removable lens cover for a camera.

BACKGROUND

Digital cameras are increasingly used in outdoors and sports environments. Lens covers protect a camera lens from damage in such environments. However, lens covers themselves may become scratched or otherwise damaged during use. Replacing lens covers traditionally requires the use of extensive tool sets in a labor-intensive process. Accordingly, there is a need for a simplified lens cover replacement system for action cameras used in outdoors and sports environments.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "Fig.") 1 illustrates the components of an example camera system, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

In one embodiment, a camera is configured for use with a removable camera lens cover. The lens cover can be secured to or removed from the camera by a user without the use of a tool set. The mechanism which allows the lens cover to be secured to and removed from the camera includes a set of wires embedded into the lens cover and a set of wedges protruding from the lens wall of the camera. The wires are secured onto a rear surface of the lens cover with a securing mechanism, such as screws. The wedges protrude from the outside surface of the lens wall opposite each other and taper outwards towards the normal plane of the lens wall. The lens cover includes a hole within the rear surface of the lens cover to accommodate the lens wall of the camera.

To secure the lens cover to the camera, the lens cover is placed over the lens wall of the camera such that the hole within the rear surface of the lens cover is aligned with the lens wall and until the rear surface of the lens cover abuts a front surface of the lens wall. Subsequently, the lens cover is rotated relative to the camera until each wire aligns with a corresponding different wedge. In this configuration, the wires of the lens cover are secured underneath the tapered surface of the wedges of the camera, preventing the lens cover from being removed from or rotating relative to the camera. To remove the lens cover from the camera in the same embodiment, a force is applied to the lens cover away from and normal to the front surface of the camera. The applied force causes the wires of the lens cover to slide along the corresponding tapered surface of the wedges of the camera, flexing the wires outward and away from each other and enabling the rotation, and thereby removal, of the lens cover from the camera.

Example Camera System Configuration

Figure 1:
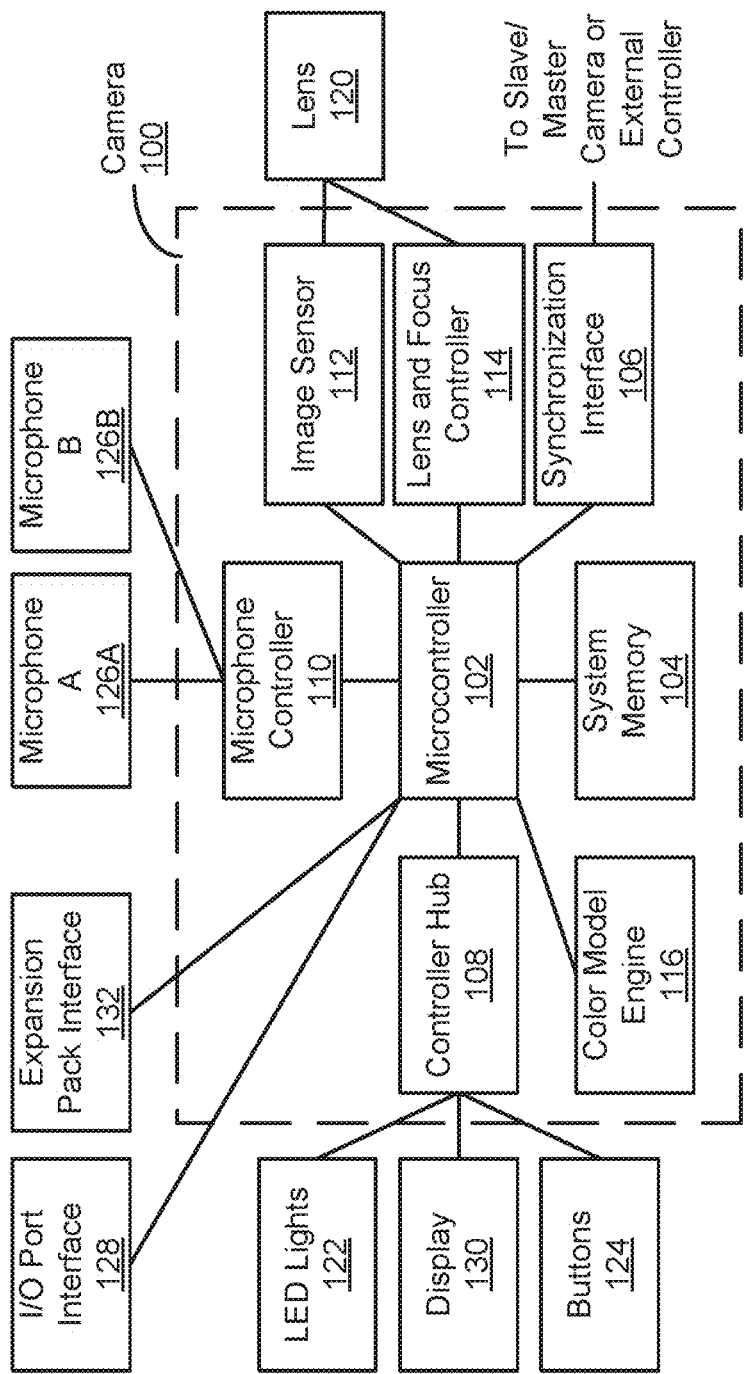

FIG. 1 is a block diagram illustrating electronic components of a camera 100, according to one embodiment. The camera 100 of the embodiment of FIG. 1 includes one or more microcontrollers 102, a system memory 104, a synchronization interface 106, a controller hub 108, one or more microphone controllers 110, an image sensor 112, a lens and focus controller 114, a color model engine 116, one or more lenses 120, one or more LED lights 122, one or more buttons 124, one or more microphones 126, an I/O port interface 128, a display 130, and an expansion pack interface 132.

The camera 100 includes one or more microcontrollers 102 (such as a processor) that control the operation and functionality of the camera 100. For instance, the microcontrollers 102 can execute computer instructions stored on the memory 104 to perform the functionality described herein. It should be noted that although LUT generation and color model conversion are described herein as performed by the camera 100, in practice, the camera 100 can capture image data, can provide the image data to an external system (such as a computer, a mobile phone, or another camera), and the external system can generate a LUT based on the captured image data.

A lens and focus controller 114 is configured to control the operation, configuration, and focus of the camera lens 120, for instance based on user input or based on analysis of captured image data. The image sensor 112 is a device capable of electronically capturing light incident on the image sensor 112 and converting the captured light to image data. The image sensor 112 can be a CMOS sensor, a CCD sensor, or any other suitable type of image sensor, and can include corresponding transistors, photodiodes, amplifiers, analog-to-digital converters, and power supplies.

A system memory 104 is configured to store executable computer instructions that, when executed by the microcontroller 102, perform the camera functionalities described herein. The system memory 104 also stores images captured using the lens 120 and image sensor 112. The memory 104 can include volatile memory (e.g., random access memory (RAM)), non-volatile memory (e.g., a flash memory), or a combination thereof.

A synchronization interface 106 is configured to communicatively couple the camera 100 with external devices, such as a remote control, another camera (such as a slave camera or master camera), a computer, or a smartphone. The synchronization interface 106 may transfer information through a network, which allows coupled devices, including the camera 100, to exchange data other over local-area or wide-area networks. The network may contain a combination of wired or wireless technology and make use of various connection standards and protocols, such as WiFi, IEEE 1394, Ethernet, 802.11, 4G, or Bluetooth.

A controller hub 108 transmits and receives information from user I/O components. In one embodiment, the controller hub 108 interfaces with the LED lights 122, the display 130, and the buttons 124. However, the controller hub 108 can interface with any conventional user I/O component or components. For example, the controller hub 308 may send information to other user I/O components, such as a speaker.

A microphone controller 110 receives and captures audio signals from one or more microphones, such as microphone 126A and microphone 126B. The microphone controller 110 is configured to control the operation of the microphones 126. In some embodiments, the microphone controller 110 selects which microphones from which audio data is captured. For instance, for a camera 100 with multiple microphone pairs, the microphone controller 110 selects one microphone of the pair to capture audio data.

Additional components connected to the microcontroller 102 include an I/O port interface 128 and an expansion pack interface 132. The I/O port interface 128 may facilitate the camera 100 in receiving or transmitting video or audio information through an I/O port. Examples of I/O ports or interfaces include USB ports, HDMI ports, Ethernet ports, audioports, and the like.

Furthermore, embodiments of the I/O port interface 128 may include wireless ports that can accommodate wireless connections. Examples of wireless ports include Bluetooth, Wireless USB, Near Field Communication (NFC), and the like. The expansion pack interface 132 is configured to interface with camera add-ons and removable expansion packs, such as an extra battery module, a wireless module, and the like.

Figure 2A:
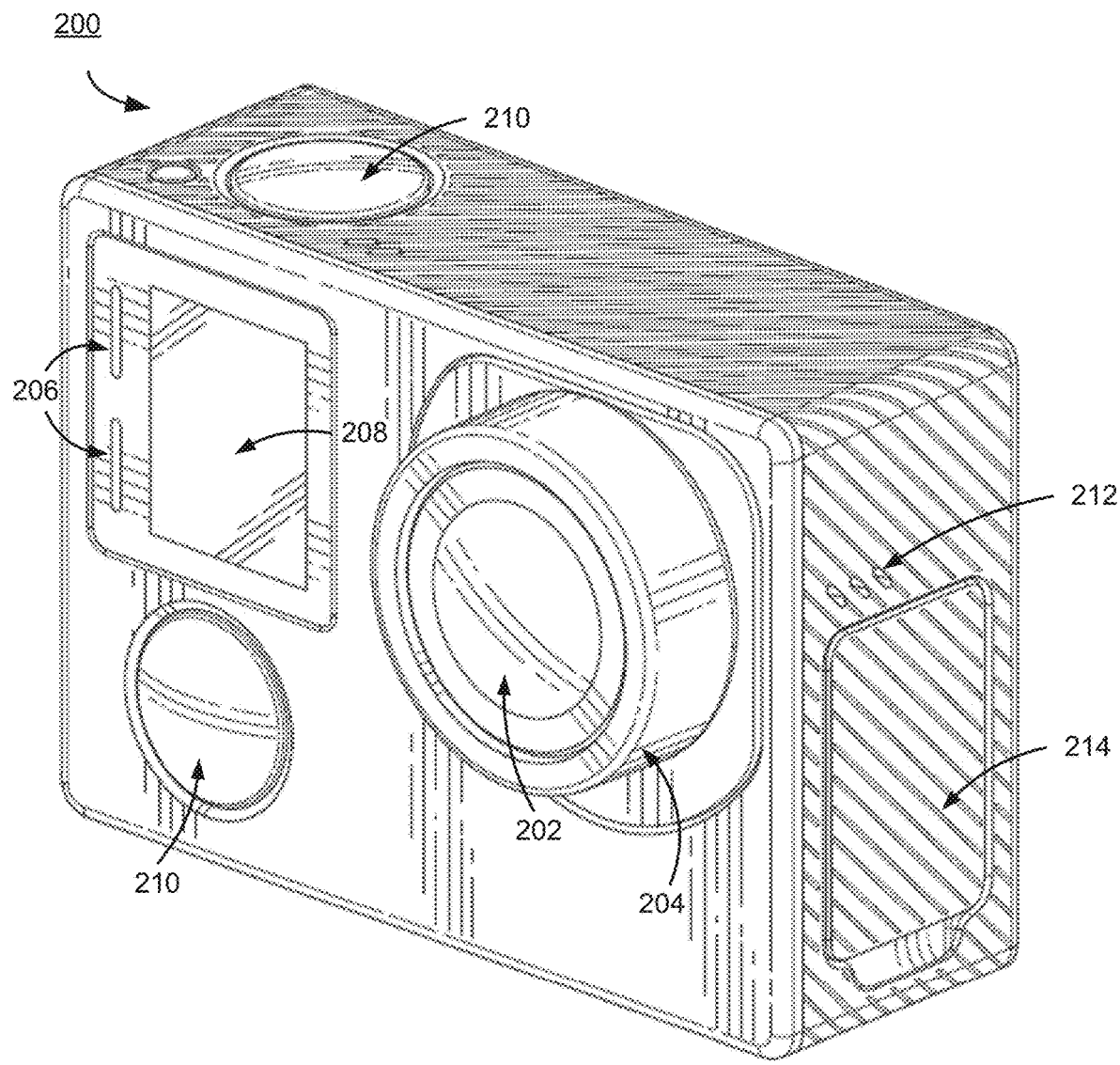
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
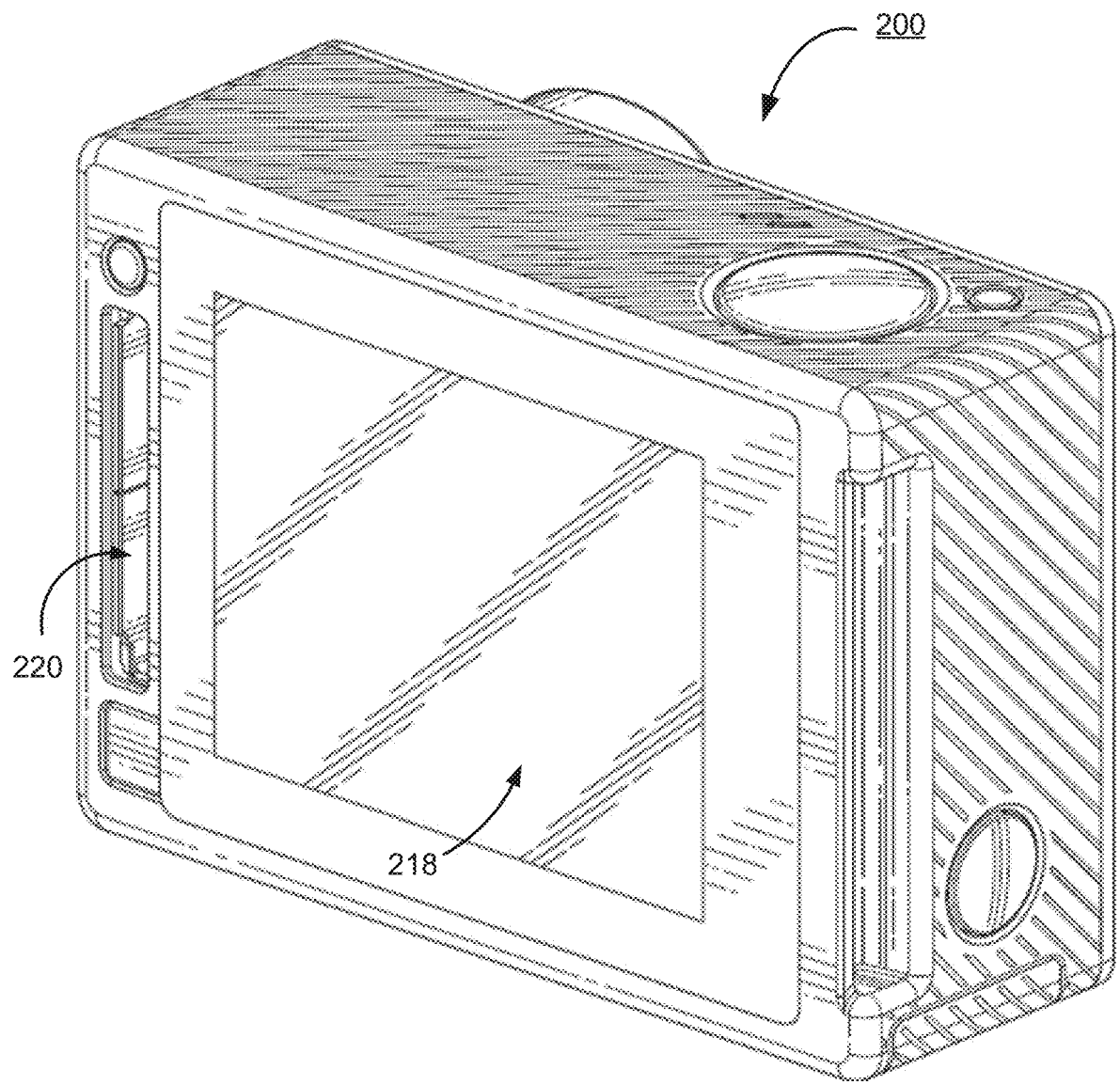
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a display 218 configured to display camera information or image information (such as captured images or viewfinder images). The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Removable Camera Lens Cover

Figure 3A:
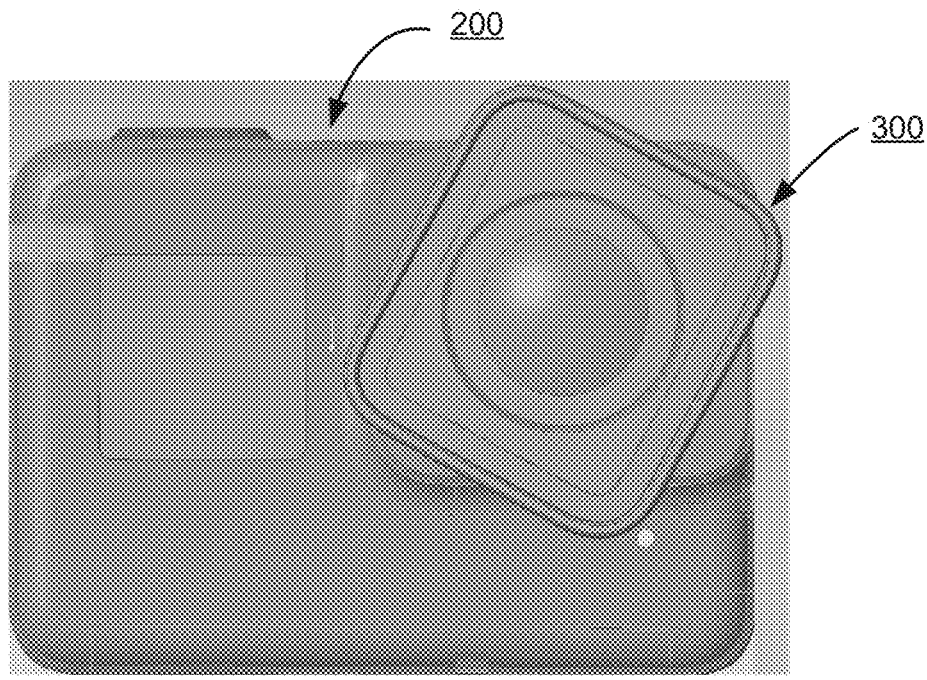
FIGS. 3a and 3b illustrate the rotation of a removable camera lens cover to secure the lens cover to a camera, according to one embodiment.
Figure 3B:
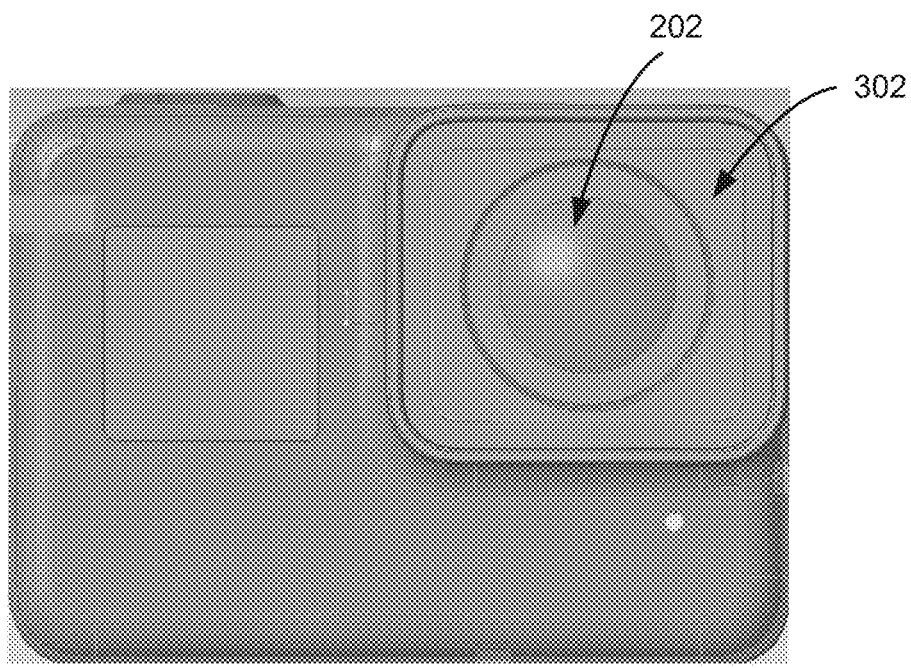

FIGS. 3a and 3b illustrate the rotation of a removable camera lens cover to secure the lens cover to a camera, according to one embodiment. In the embodiment of FIG. 3a, the removable lens cover 300 is placed over the lens of and onto the front surface of the camera 200 in a rotated position relative to the camera, illustrating an unlocked configuration. In the unlocked configuration, the removable lens cover 300 can be removed from the camera 200 or can be rotated and secured to the camera. In the embodiment of FIG. 3b, the removable lens cover 300 is shown in a locked configuration. In the locked configuration, the removable lens cover 300 is rotated from the unlocked configuration illustrated in FIG. 3a to the orientation illustrated in FIG. 3b, thereby securing the removable lens cover to the camera 200. In some embodiments, when the removable lens cover 300 is in the unlocked configuration, the removable lens cover can be rotated clockwise or counter-clockwise relative to the camera 200 to configure the removable lens cover into the locked configuration.

In the embodiments of FIGS. 3a and 3b, the removable lens cover 300 is substantially rectangular in shape with rounded corners, though in other embodiments, the removable lens cover can be any suitable shape. In some embodiments, the removable lens cover 300 includes an outer wall with a top segment, a bottom segment, a left segment, and a right segment. The removable lens cover also includes a transparent protective lens surface 302 affixed to the outer wall. In some embodiments, when the removable lens cover 300 is configured in the locked configuration, one or more of the top segment, the bottom segment, the right segment, and the left segment are either substantially parallel with one or more surfaces of the camera 200 or are substantially flush with one or more surfaces of the camera. For example, in the embodiment of FIG. 3b, the top segment and the right segment of the removable lens cover outer wall are substantially flush with the top surface and the right surface of the camera 200, respectively.

In the locked configuration shown in the embodiment of FIG. 3b, the protective lens surface 302 shields the lens 202 of the camera 200 from outside elements which can cause damage to the lens. A watertight seal is created between a rear surface of the removable lens cover 300 and a front surface of the camera 200, creating a cavity between the camera and the removable lens cover and preventing water, debris, and other outside elements from entering the cavity and causing damage to the camera. In some embodiments, a portion of the outer wall of the removable lens cover 300 is made of a thermally conductive material and acts as a heat sink for the excess heat created by camera components (such as image processors, image sensors, and the like) thermally coupled to the outer wall by a thermal conduit adjacent to or abutting the camera components and the outer wall. In the locked configuration shown in the embodiment of FIG. 3b, heat from the camera components is transferred to the thermal conduit (which can be located within the camera), to the outer front surface of the camera 200 under the removable lens cover 300, and to the thermally conductive material of the outer wall of the removable lens cover, where it is dissipated, for instance by water or air. These thermal channels provide a pathway to transfer the excess heat from internal camera components out of the camera 200 via the removable lens cover 300, preventing overheating and potential damage to the camera.

Figure 4:
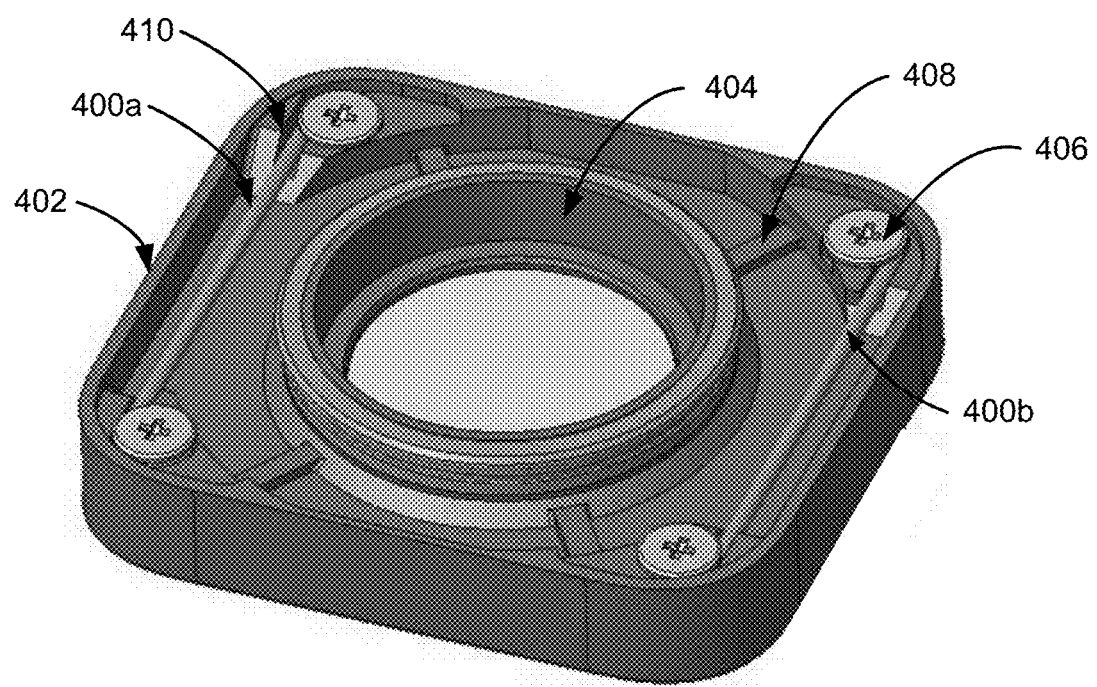
FIG. 4 illustrates a perspective view of a rear side of the removable camera lens cover of FIG. 3, according to one embodiment.

FIG. 4 illustrates a perspective view of a rear side of the removable camera lens cover of FIG. 3, according to one embodiment. The rear side of the removable lens cover 300 includes a lens hole 404 located in the center of the removable lens cover, aligning with the lens 202 of the camera 200 when the removable lens cover is configured in the locked configuration. Surrounding the lens hole 404 is a plurality of notches 408 protruding outward from the rear surface and radially away from the lens hole. In some embodiments, the plurality of notches 408 interlock with a reciprocal plurality of grooves on the camera 200 to ensure correct alignment of the removable lens cover 300 when it is configured in the locked configuration with the camera. In the embodiment of FIG. 4, the plurality of notches 408 are substantially rectangular in shape, but in other embodiments, the plurality of notches can be any shape, size, or configuration.

The rear side of the removable lens cover 300 also includes a plurality of flexible securing structures 400a and 400b (collectively "400" hereinafter). In the embodiment of FIG. 4, the flexible securing structures 400 can be a set of wires in a parallel configuration on opposite sides of the removable lens cover 300. In some embodiments, each end of each wire is embedded into a partial channel (such as partial channel 410) on the rear side of the removable lens cover 300. The ends of the wires are secured into the partial channels, for instance, using screws 406, latches, adhesives, or any suitable securing mechanism. In some embodiments, each end of a wire is embedded into one of a corresponding pair of partial channels, each partial channel in the pair of partial channels being substantially aligned and/or collinear. Spanning between each pair of partial channels is a clearance space for wedges of the camera 200 (as described below), beneficially allowing the wedges to abut the flexible securing structures 400 in the locked configuration. The material of the flexible securing structures 400 can be made of a type of metal, such as aluminum or steel, and can be rigid enough to retain its position in the locked configuration but flexible enough to allow the removable lens cover 300 to be removed from the camera 200. In other embodiments, the flexible securing structures 400 may be rods, cylinders, pins, dowels, and the like.

Figure 5:
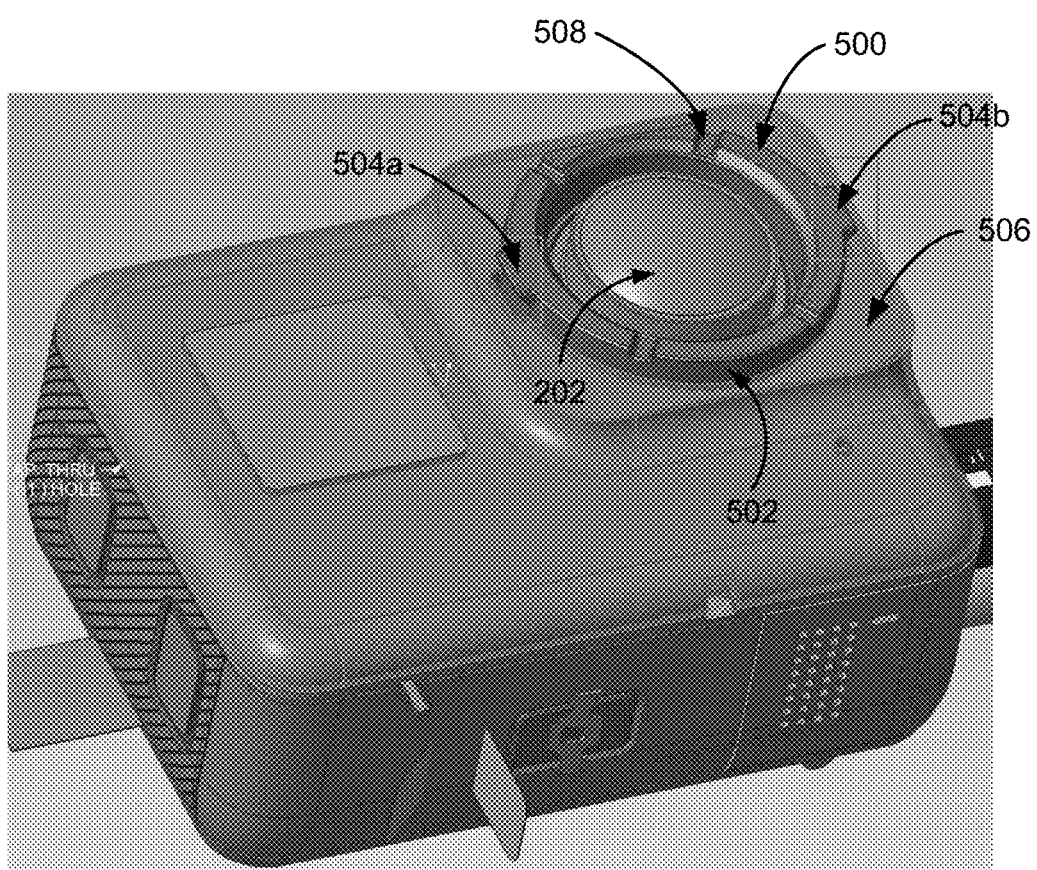
FIG. 5 illustrates a perspective view of a camera for use with a removable lens cover, according to one embodiment.

FIG. 5 illustrates a perspective view of a camera for use with a removable lens cover, according to one embodiment. In the embodiment of FIG. 5, the camera 200 includes a lens wall 500 which surrounds the lens 202. The lens wall 500 includes a plurality of wedges 504 that protrude and taper outwards from the outside surface 502 of the lens wall 500. In some embodiments, each wedge 504 corresponds to a reciprocal flexible securing structure 400 such that each wedge aligns with a reciprocal flexible securing structure when the removable lens cover 300 is in the locked configuration. In the embodiment of FIG. 5, each wedge 504 is configured such that it will secure a flexible securing structure 400 underneath the tapered surface of the wedge when the removable lens cover 300 is in the locked configuration. In such a configuration, the flexible securing structure substantially abuts a portion of the tapered surface of the wedge 504, preventing the removable lens cover 300 from rotating absent the application of an outward force being applied to the removable lens cover and securing the removable lens cover to the front surface 506 of the camera 200.

In some embodiments, each wedge 504 applies an outward force on the reciprocal flexible securing structure 400, but the applied force is less than a threshold force required to flex the flexible securing structure outward enough such that the removable lens cover 300 can be rotated relative to the camera 200. When a threshold force is applied on the removable lens cover outward and normal to the camera, the wedges 504 exert a corresponding force on the flexible securing structures 400, causing the flexible securing structures to flex outward and away from the lens wall 500, beneficially enabling the removable lens cover to rotate relative to the camera such that the removable lens cover can be configured from the locked configuration into the unlocked configuration, and thus removed from the camera 200.

The camera 200 also includes a plurality of grooves 508 indented into the top surface of the lens wall 500. The locations and shape of the plurality of grooves 508 correspond to the locations and shape of the plurality of notches 408 on the removable lens cover 300. Accordingly, when the removable lens cover 300 is in the locked configuration, each of the plurality of notches 408 is inserted into a corresponding groove 508, beneficially ensuring the correct alignment of the removable lens cover when it is in a locked configuration and further preventing the rotation of the removable lens cover.

Figure 6A:
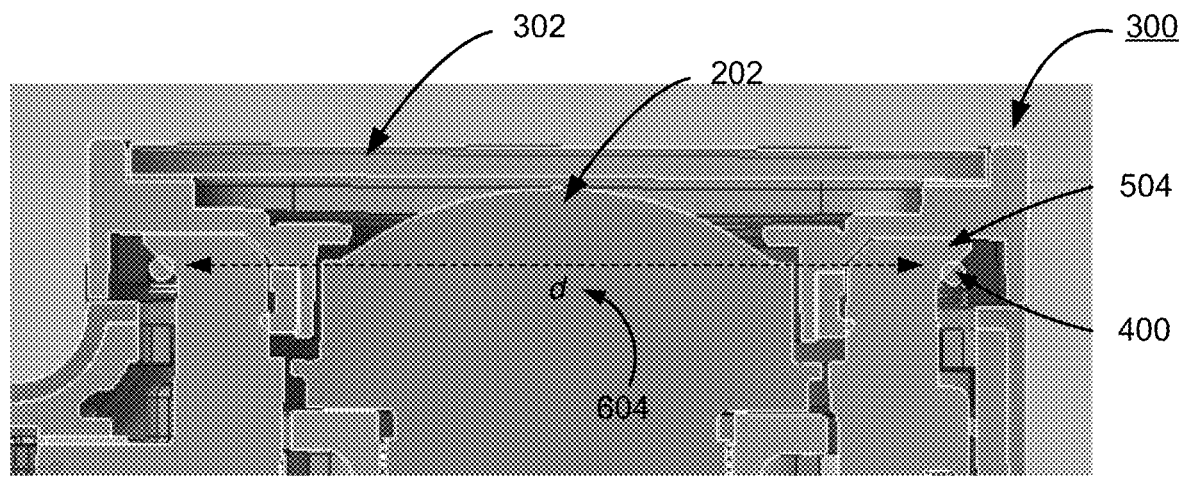
FIGS. 6a and 6b illustrate a cross-sectional view of a mechanism for securing a removable lens cover to a camera, according to one embodiment.

FIG. 6a illustrates a cross-sectional view of a mechanism for securing a removable lens cover to a camera, according to one embodiment. In the embodiment of FIG. 6a, the illustrated cross-section shows the camera 200 and the removable lens cover 300 in the locked configuration. In the locked configuration, the rear surface of the removable lens cover 300 abuts the lens wall 500, and the flexible securing structures 400 abut the tapered surfaces of the corresponding wedges 504 of the camera 200. In the embodiment of FIG. 6a, the distance d 604 represents the distance between the flexible securing structures 400. In the locked configuration, the distance d 604 is at its minimum length, allowing the plurality of flexible securing structures 400 to substantially retain their position underneath the plurality of wedges 504 and preventing the removable lens cover 300 from rotating relative to and being removed from the camera 200.

Figure 6B:
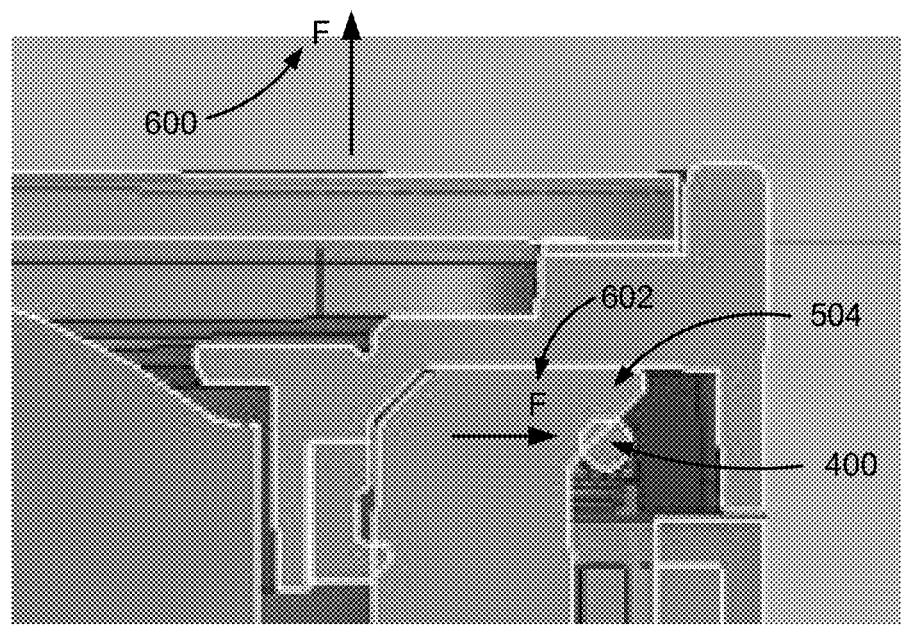

FIG. 6b illustrates a perspective, cross-sectional view of a mechanism for removing a removable lens cover from a camera, according to one embodiment. To remove the removable lens cover 300 from the camera 200, a threshold force 600 is applied to the removable lens cover by a user of the camera, outwardly normal to the front surface of the removable lens cover. For each of the wedges 504 in the plurality of wedges in the embodiment of FIG. 6b, when the threshold force 600 is applied, the threshold force causes the wedge to apply a reciprocal force 602 to the flexible securing structure 400, thereby causing the flexible securing structure to flex outward and slide along the tapered surface away from the lens wall 500. When the flexible securing structures 400 flex outward from the lens wall, the distance d 604 increases, thereby enabling the rotation and removal of the removable lens cover from the camera 200. In other embodiments, the wedges 504 are configured in an opposite configuration such that the threshold force 600 applied to the removable lens cover 300 is inwardly normal to the front surface of the removable lens cover, causing a reciprocal force to flex the flexible securing structures outward.

The embodiments shown in FIGS. 3 through 6 employ a rotating mechanism to secure the removable lens cover 300 to the camera 200. In other embodiments, the removable lens cover 300 could be attached to the camera 200 through other securing mechanisms, such as a sliding fit, a snapping fit, a threaded fit, and the like, which allow a user to easily secure and remove a removable lens cover from a camera without the use of a tool set.

Additional Configuration Considerations Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for detachable camera mounts as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A lens cover configured for removable connection to a camera, the lens cover comprising:
a lens hole configured in correspondence with a lens of the camera such that light passes through the lens hole to enter the lens of the camera, whereby the light is directed onto an image sensor located within the camera and configured to capture the light and convert the light into image data;
recesses configured to receive wedges protruding from a front end of the camera; and
securing structures configured for positioning between the wedges and a body of the camera when the lens cover is removably connected to the camera, wherein the securing structures include opposite ends spaced approximately equidistant from a center of the lens hole.

2. The lens cover of claim 1, wherein the recesses and the securing structures are arranged in an alternating manner.

3. The lens cover of claim 1, wherein the recesses and the securing structures are non-linear in configuration.

4. The lens cover of claim 1, wherein the recesses include:
a first recess; and
a second recess spaced from the first recess about the lens hole.

5. The lens cover of claim 4, wherein the first recess and the second recess are positioned in generally diametrical opposition.

6. The lens cover of claim 4, wherein the securing structures include:
a first securing structure; and
a second securing structure spaced from the first securing structure about the lens hole.

7. The lens cover of claim 6, wherein the first securing structure and the second securing structure are positioned in generally diametrical opposition.

8. The lens cover of claim 6, wherein:
the first securing structure is offset from the first recess about the lens hole by approximately 90 degrees;
the second recess is offset from the first securing structure about the lens hole by approximately 90 degrees; and
the second securing structure is offset from the first recess and the second recess about the lens hole by approximately 90 degrees.

9. The lens cover of claim 1, wherein the securing structures are spaced radially inward from an outer wall of the lens cover.

10. The lens cover of claim 9, wherein the outer wall of the lens cover includes rounded corner portions defining apertures configured to receive mechanical fasteners.

11. A lens cover configured for removable connection to a camera defining an optical axis, the lens cover comprising:
a first recess defined by discrete first and second end walls extending along the optical axis, wherein the first recess is configured to receive the camera during connection of the lens cover;
a first securing structure configured for engagement with the camera upon rotation of the lens cover;

a second recess defined by discrete first and second end walls extending along the optical axis, wherein the second recess is configured to receive the camera during connection of the lens cover; and a second securing structure configured for engagement with the camera upon rotation of the lens cover, wherein the first securing structure and the second securing structure each include opposite ends spaced approximately equidistant from a centerpoint of the lens cover.

12. The lens cover of claim 11, wherein the first recess is configured to receive a first wedge protruding from a front end of the camera, and wherein the second recess is configured to receive a second wedge protruding from the front end of the camera.

13. The lens cover of claim 11, wherein the first securing structure is spaced 90 degrees from the first recess about the optical axis.

14. The lens cover of claim 13, wherein the second recess is spaced 90 degrees from the first securing structure about the optical axis.

15. The lens cover of claim 14, wherein the second securing structure is spaced 90 degrees from the first recess and the second recess.

16. A lens cover configured for removable connection to a camera, the lens cover comprising:

a lens hole configured in correspondence with a lens of the camera such that when the lens cover is connected to the camera, light passes through the lens hole and enters the lens of the camera, whereby the light is directed onto an image sensor located within the camera and configured to capture the light and convert the light into image data;

a pair of recesses positioned in generally diametrical opposition about the lens hole and configured to receive the camera such that the camera extends into the pair of recesses during connection of the lens cover to the camera; and a pair of securing structures positioned in generally diametrical opposition about the lens hole and configured for engagement with the camera to thereby secure the lens cover to the camera, wherein the pair of securing structures are circumferentially offset from the pair of recesses about the lens hole such that the pair of securing structures are configured to engage the camera via rotation of the lens cover through a range of motion of approximately 90 degrees about the lens hole.

17. The lens cover of claim 16, wherein the pair of recesses are defined by discrete end walls extending from the lens cover along a central axis of the lens hole.

18. The lens cover of claim 16, wherein the pair of securing structures and the pair of recesses are arranged in an alternating manner.

19. The lens cover of claim 16, further comprising:
fasteners configured to extend into apertures located radially outward of the lens hole.

20. The lens cover of claim 16, further comprising:
a seal located radially inward of the pair of recesses and the pair of securing structures.

* * * * *